June 11, 1940.   C. W. CHAPMAN   2,204,068
INTERNAL-COMBUSTION ENGINE OF THE FUEL-INJECTION COMPRESSION-IGNITION TYPE
Filed May 24, 1939   2 Sheets-Sheet 1

Charles Wallace Chapman
by his attys
Stebbins, Blenko & Parmelee

June 11, 1940.  C. W. CHAPMAN  2,204,068
INTERNAL-COMBUSTION ENGINE OF THE FUEL-INJECTION COMPRESSION-IGNITION TYPE
Filed May 24, 1939   2 Sheets-Sheet 2
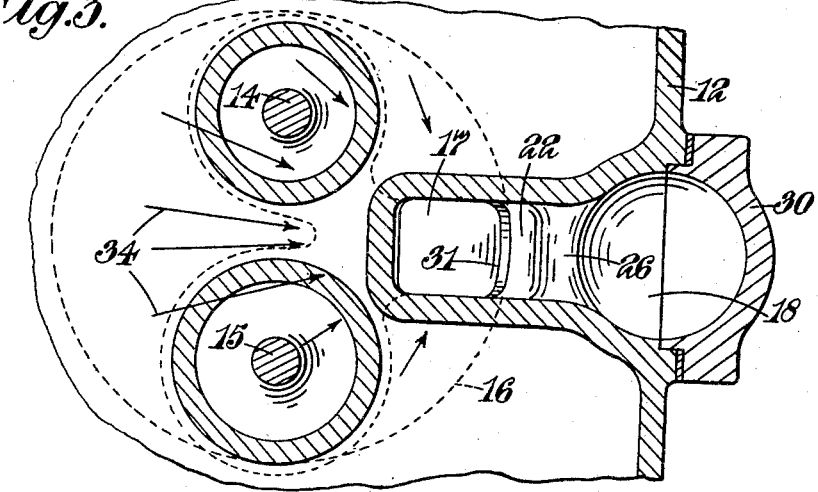
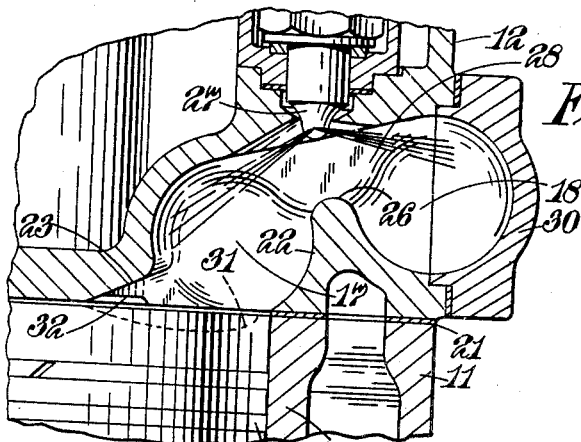
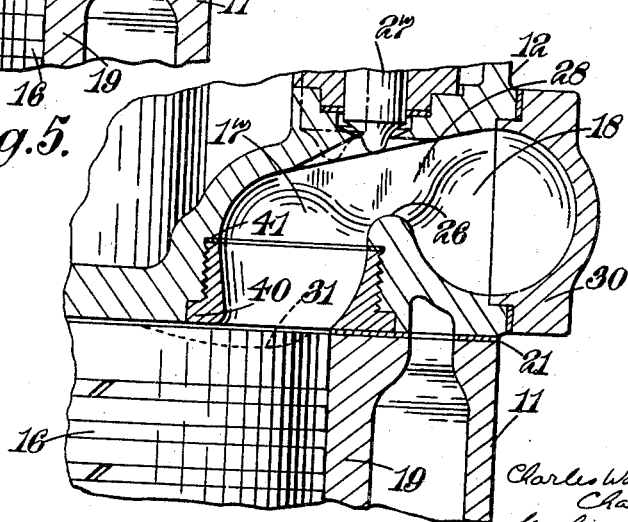

Patented June 11, 1940

2,204,068

UNITED STATES PATENT OFFICE 2,204,068

INTERNAL-COMBUSTION ENGINE OF THE FUEL - INJECTION COMPRESSION - IGNITION TYPE

Charles Wallace Chapman, Peterborough, England, assignor to F. Perkins Limited, Peterborough, England, a British company Application May 24, 1939, Serial No. 275,417
In Great Britain July 14, 1938

2 Claims. (Cl. 123—32)

This invention comprises improvements in or relating to internal-combustion engines of the fuel-injection compression-ignition type.

It has been proposed in prior United States Patent No. 2,021,744 to provide a compression-ignition internal-combustion engine with a small combustion chamber communicating with the compression space in the cylinder through a transfer passage, and to inject fuel into the transfer passage in such a way that some of the fuel is projected along the passage into the combustion chamber and some of the fuel is projected along the passage toward the compression space of the cylinder. A further development of the said engine is described in United States Patent Specification Serial No. 174,959. In both the constructions described in the aforesaid patent specifications toward the end of the compression stroke of the engine, that is to say at the time when injection commenced, the part of the fuel which was projected along the transfer passage toward the compression space of the engine cylinder had to travel in a direction opposite to the general direction of flow of gas along the passage. It is an object of the present invention to provide in a construction of internal-combustion engine of the type in which fuel is introduced by injection and ignited by the heat of compression and the injection of the fuel is effected both into a combustion chamber and in a direction toward the engine cylinder, for both injections of fuel to take place in the same general sense as that of the flow of the air.

According to the present invention, in an internal-combustion engine of the type described two combustion chambers are provided, one opening directly from the engine cylinder and the other opening out of the first, the circulation of air being arranged to be divided between the two combustion chambers and the fuel being injected in opposite directions toward each of the two combustion chambers from a single point located approximately between the paths of the air where it is divided.

The following is a description by way of example of certain constructions in accordance with the invention.

In the drawings—

Figure 3 is a section upon the line 3—3 of Figure 1 looking in the direction of the arrows;

Figure 4 is a view similar to Figure 1 of a modified construction; and

Figure 5 is a similar view of another modification.

Figure 1:
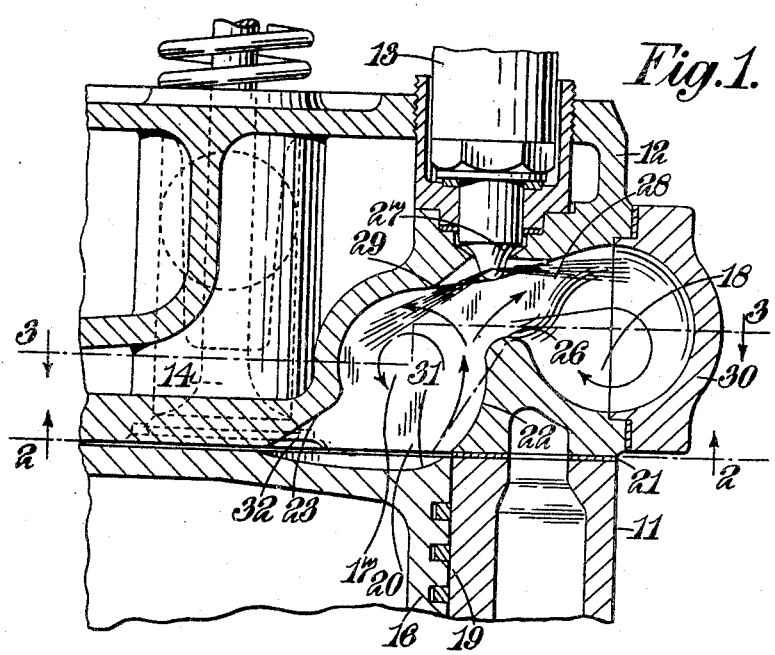
Figure 1 is a vertical section through one construction along the centre line of the engine cylinder.
Figure 2:
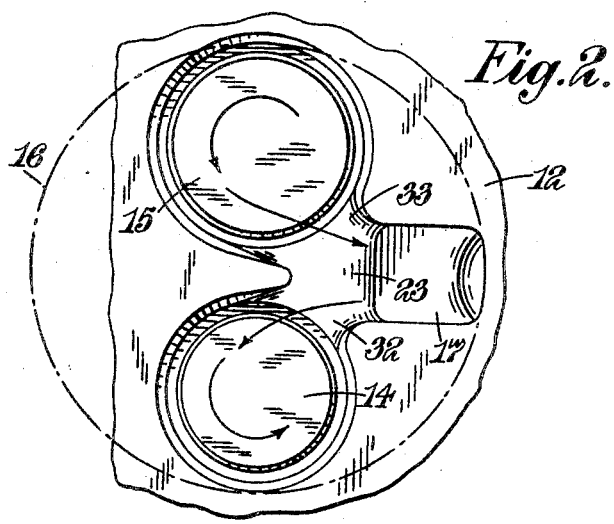
Figure 2 is an underside view of a portion of the lower face of the cylinder head looking in the direction of the arrows 2—2 of Figure 1.

Referring to Figure 1, the engine is provided with a cylinder 11 and a detachable head 12 in which are located a fuel injector 13, an exhaust valve 14 and an inlet valve 15 (Figure 2). In the cylinder is a piston 16.

The cylinder head has two combustion chambers 17, 18; the first combustion chamber, as viewed in Figure 1, is located close to the end of the cylinder 11 and at such a distance from the axis as to be partly outside the line of the cylinder wall 19. The combustion chamber 17 is substantially cylindrical and has its axis at right-angles to the cylinder axis and is in communication with the cylinder through a large port 20 formed by the walls of the combustion chamber intersecting the plane of the joint 21 of the cylinder head on the top of the cylinder. Owing to the location of the combustion chamber 17 the port 20 is located in the corner between the cylinder wall and the head of the cylinder and air which is compressed into the combustion chamber during the compression stroke is therefore not only being driven by the advancing piston 16 into the port in a direction parallel with the cylinder axis but also has a considerable component of lateral displacement which drives the air mainly up the wall 22 of the combustion chamber which lies furthest from the cylinder axis, as indicated by the arrows in Figure 1. This induces a swirling movement in the air in the combustion chamber 17.

In the drawings the port 20 is shown as enlarged by the metal being cut away in an inclined line as shown at 23. The second combustion chamber 18 is spherical and is connected with the first combustion chamber by a passage 26 which opens out of the chamber 17 tangentially at the part of its periphery which lies furthest from the engine cylinder. This passage is also tangential to the second combustion chamber 18 and when the air is driven up the wall 20 of the chamber 17 as already described, it strikes the wall of the passage 26 somewhat at an angle and part of it is deflected to the right as viewed in Figure 1 and passes into the second combustion chamber where it executes a swirling movement as indicated by the arrows. Approximately midway between the two combustion chambers the injector nozzle 13 is located and enters the transfer passage 26 from the side which is more remote from the engine cylinder. The injection nozzle has a tip 27 which is provided with two jets, one to direct the fuel in a spray as shown at 28 into the chamber 18, and the other to produce a spray 29 into the chamber 17. It will be observed that the spray 28 enters the chamber 18 in substantially the same direction as the air which is being driven into it and that the jet 29 enters the chamber 17 also in a direction which generally corresponds with that of the swirl of the gases therein.

The combustion chamber 18 is located close to the outer wall of the side of the cylinder head 12 and is provided with a removable cover 30. If desired, the engine piston 16 may be slightly recessed at the portion 31 which lies immediately opposite to the port 17 so that the walls of the recess constitute a continuation of the walls of the combustion chamber 17 when the piston 16 is at the end of its stroke as illustrated in Figure 1, as this tends to assist in the creation and maintenance of the swirling movement of the gases.

It will thus be seen that by the above described construction, although the fuel is injected in opposite directions into the two combustion chambers, the one nearer to the engine cylinder and the other more remote therefrom, yet the injection of the fuel is in both instances approximately parallel with, or at all events in the same general sense as, the flow of the gases, that is to say the combustion air.

It will be seen from an examination of Figure 2 that the exhaust and inlet valves 14, 15 lie in shallow pockets in the cylinder head and these pockets may be connected by shallow depressions 32, 33 with the inlet port 17 and this tends to prevent any air from being trapped between the valves and the cylinder head and not being utilised in the combustion of the gases.

The arrows 34 in Figure 3 show the general direction of flow of gases during the compression stroke of the engine toward the port 20 of the combustion chamber 17.

In the alternative construction illustrated in Figure 4, the general arrangement is the same and the parts are similarly lettered but the first combustion chamber 17 is spherical instead of being cylindrical.

In the further alternative construction shown in Figure 5, the general arrangement is similar to that already described and again the parts are given similar reference numerals, where they correspond. The chamber 17 is, however, in this instance in part constituted by a plug 40 which is screwed into the head 12 from the inner face of the cylinder head, that is to say, the joint face. The plug 40 is hollowed out internally so as to constitute a continuation of the walls of the upper half of the chamber, which is cast, as before, in the material of the cylinder head 12. The use of the removable plug 14 permits the interior of the walls of the combustion chamber to be more readily machined all over. Furthermore, the plug 40 may be, by reason of its separate construction, partly heat-insulated from the water-cooled head 12 and retain part of the heat of combustion. This may be accentuated by the insertion of packing material or an air gap between the flange on the head of the plug or at the joint 41 where the plug meets the walls of the combustion chamber 17.

It will be understood that in any of the constructions the walls of the second combustion chamber 18 can readily be machined all over on account of the removable cover 30.

Although the fuel nozzle 27 has been described as located in the transfer passage 26 between the two combustion chambers it will be understood that it might be located somewhat to one side of this position either in the first combustion chamber or in the second combustion chamber so long as it is sufficiently near to and between the divided paths of combustion air to ensure that the streams of fuel are upon the whole flowing in the same general sense as the air.

In order to reduce heat losses to a minimum the port 17 between the first combustion chamber and the engine cylinder should be of the maximum dimensions compatible with maintaining a suitable swirling movement in the gases therein.

I claim:

1. In an internal combustion engine of the type described, the combination of an engine cylinder, a head therefor, first and second swirl-type combustion chambers close together in the head, the first of said chambers communicating directly with the cylinder through a port so located that gases entering said chamber from the cylinder swirl around the walls of the chamber, the said chamber having also a transfer port between the chambers spaced from said first port along the wall of said first chamber so that gases circulating in the first chamber may divide and part of them pass into the second chamber and swirl therein, and a fuel injector the tip of which is located within the chambers at said transfer port approximately between the paths of the gases where they are divided and having jets to direct fuel in two directions one with the stream of gas circulated in the first chamber and the other with the stream of gas circulated in the second chamber.

2. In an internal-combustion engine of the type described a construction as claimed in claim 1, wherein the first combustion chamber which opens directly from the engine cylinder is located close to one side of the cylinder axis and close to the cylinder wall so that circulation may proceed up that wall of the chamber which lies furthest from the cylinder axis and the transfer port between the chambers is constituted by a short passageway located in this wall tangentially to the two chambers.

CHARLES WALLACE CHAPMAN.